United States Patent [19]
Sung et al.

[11] Patent Number: 5,207,929
[45] Date of Patent: May 4, 1993

[54] METHOD FOR REMOVING HYDROCARBONS FROM POLYMER SLURRIES

[75] Inventors: Chieh-Yuan F. Sung, Cincinnati; Stephen J. Krause, Batavia, both of Ohio

[73] Assignee: Quantum Chemical Corporation, New York, N.Y.

[21] Appl. No.: 739,876

[22] Filed: Aug. 2, 1991

[51] Int. Cl.$^5$ .............................................. C08F 6/00
[52] U.S. Cl. .................................... 210/774; 210/805; 210/806; 528/501; 528/503
[58] Field of Search ............... 210/180, 181, 768, 774, 210/805, 806; 528/483, 495, 497, 501, 503

[56] References Cited

U.S. PATENT DOCUMENTS

| | | | |
|---|---|---|---|
| 3,285,899 | 10/1966 | Houser et al. | 528/501 |
| 4,126,743 | 11/1978 | Shiomura et al. | 528/503 |
| 4,499,263 | 2/1985 | Messura et al. | |
| 4,737,280 | 4/1988 | Hanson | 210/181 |

OTHER PUBLICATIONS pick heaters, Inc., P.O. Box 516, West Bend, Wis., advertisement.

Primary Examiner—Robert A. Dawson
Assistant Examiner—David Reifsnyder
Attorney, Agent, or Firm—Kenneth D. Tremain; William A. Heidrich

[57] ABSTRACT

Methods and apparatus for the removal of hydrocarbons from polymer slurries are disclosed. The invention includes feeding a hydrocarbon-containing polymer slurry to a flash tank to flash a portion of the hydrocarbon from the slurry. A fraction of the residual slurry is circulated through a heating means and recirculated back to the flash tank to flash additional hydrocarbon from the slurry. The invention is applicable to remove isobutane solvent from an aqueous polyethylene slurry. It is also applicable to the removal of other hydrocarbons, including solvents, monomer and comonomer from polymer slurries.

27 Claims, 1 Drawing Sheet

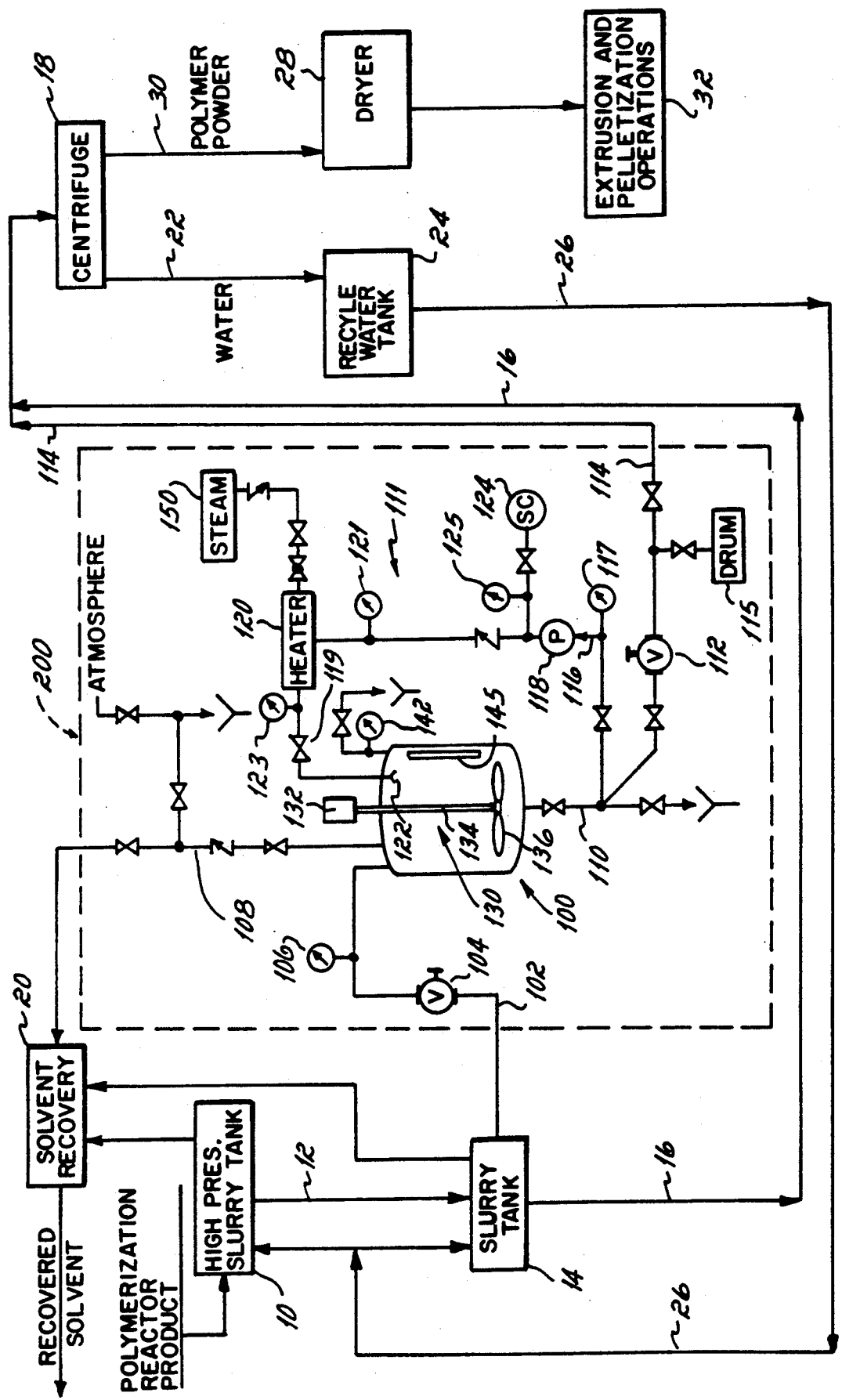

METHOD FOR REMOVING HYDROCARBONS FROM POLYMER SLURRIES

FIELD OF THE INVENTION

The present invention is directed to a method and apparatus for reducing hydrocarbon emissions, and more particularly to a method and apparatus for removing hydrocarbons from polymer slurries.

BACKGROUND OF THE INVENTION

The production of solid polymer particles, which are suitable for pelletization and use in subsequent manufacturing processes, may be accomplished by any one of many known polymerization techniques. In such processes, a slurry stream may be formed which consists of the particulate polymer suspended in a liquid hydrocarbon diluent, which acts as the polymerization reaction medium. This diluent may be an inert solvent or a monomer or comonomer. As an example, when ethylene is polymerized in a hydrocarbon or aqueous hydrocarbon diluent such as isobutane under controlled temperature and pressure conditions, a slurry of polymer solids and diluent is formed. This type of process is known as particle form polymerization. One drawback of this kind of process, or any process in which a polymer is prepared in solution and subsequently precipitated to form a slurry, is that the solid polymer must be separated from the liquid portion of the slurry. This liquid portion may include any suitable solvent(s) utilized in the particular polymerization process (typically these are $C_3$-$C_8$ hydrocarbons), and unpolymerized monomer and/or comonomer, all of which will be referred to hereinafter collectively as "hydrocarbon". The term "hydrocarbon" is not intended to include the polymer itself.

One known method for carrying out the liquid-solid separation is to flash the hydrocarbon into a vapor by reducing the pressure on the slurry. This may be accomplished in a suitable flash tank or series of flash tanks. The residual polymer from the flash tank, which contains additional hydrocarbon, is then dried in a fluid bed dryer prior to extrusion and/or pelletization thereof. The gas used in the fluid bed dryer, which may be heated air, nitrogen or any suitable inert gas, vaporizes additional hydrocarbon and removes it from the polymer particulate. The hydrocarbon-containing drying gas is then typically vented to the atmosphere.

The known processes for the removal of hydrocarbon from polymer slurries may not remove a sufficient quantity of the hydrocarbons from the polymer and, thus, the hydrocarbon emissions from the fluid bed dryer may be undesirably high. With the current trend toward environmental awareness and stricter emission standards, there exists a need for both methods and apparatus which are capable of reducing the emission of hydrocarbons from polymer production systems.

SUMMARY OF THE INVENTION

The present invention is directed to both methods and apparatus for removing hydrocarbons from polymer slurries, thereby reducing the undesirable emission of hydrocarbons to the atmosphere. The invention is applicable to remove hydrocarbons from polymer slurries wherein the diluent is a hydrocarbon solvent or an aqueous hydrocarbon solvent mixture. Additionally, the invention is capable of removing any unreacted monomer or comonomer from the slurry. In a preferred embodiment, the invention is designed to remove isobutane solvent from an aqueous polyethylene slurry. Preliminary tests show a reduction of residual isobutane solvent of more than 90% over prior art processes, from about 1000-6000 ppm to about 100-400 ppm solvent by weight based on polymer weight.

In its broadest aspects, the method of the present invention includes a first step of feeding a hydrocarbon-containing polymer slurry to a flash tank operated at a suitable temperature and pressure to flash a portion of the hydrocarbon from the slurry. Thereafter, at least a portion of the slurry from the flash tank is circulated through suitable heating means to heat the slurry to a temperature above the operating temperature of the flash tank and then recirculated to the flash tank to flash additional hydrocarbon from the slurry. The slurry collected from the flash tank has a substantially lower hydrocarbon content than the slurry originally fed to the flash tank. The hydrocarbon flashed from the polymer slurry is preferably vented from the flash tank and fed to a conventional hydrocarbon recovery operation, such as condensation, adsorption or absorption.

The circulation of a portion of the slurry from the flash tank through a suitable heating means to heat the slurry above the operating temperature of the flash tank and recirculation of the heated slurry to the flash tank significantly enhances the amount of solvent removed from the slurry, thereby advantageously reducing hydrocarbon emissions.

In a more specific embodiment of the method of the present invention, the hydrocarbon-containing polymer slurry is fed to one or more flash tanks in series to flash hydrocarbon from the slurry. Thereafter, the slurry, which contains still additional hydrocarbon, is fed to the flash tank, heating means and recirculation loop described hereinabove to flash additional hydrocarbon therefrom.

The preferred apparatus for practicing the present invention includes a flash tank designed to be operated at temperatures and pressures suitable to effect flash separation of one or more hydrocarbon(s) from a hydrcarbon-containing polymer slurry. The apparatus further includes means for pumping the polymer slurry to the flash tank, means for heating at least a portion of the slurry to a temperature above the operating temperature of the flash tank, means for circulating at least a portion of the slurry through the heating means, and means for recirculating the heated slurry to the flash tank to flash additional hydrocarbon from the slurry. The heating means is preferably a direct-contact, short-residence time heating device.

In a more specific application of the invention of this application, the apparatus of the present invention includes one or more additional flash tanks arranged in series for flashing hydrocarbon from the polymer slurry prior to feeding the slurry to the flash tank, heating means and recirculation loop described hereinabove.

These and other features and advantages of the present invention will become apparent to persons skilled in the art upon reading the detailed description of the invention which follows.

BRIEF DESCRIPTION OF THE FIGURE

The FIGURE schematically illustrates one embodiment of the present invention.

DETAILED DESCRIPTION OF THE INVENTION

The present invention includes methods and apparatus for the removal of hydrocarbons from polymer slurries. In a particular application of the present invention, isobutane solvent is removed from an aqueous polyethylene slurry. For purposes of the description and examples herein, reference is made to isobutane solvent as the specific hydrocarbon being removed, and polyethylene as the polymer in the slurry; however, the scope of the invention is not to be construed as limited to those specific compounds. It will be appreciated that the method and apparatus of the present invention have broader applicability to the removal of various hydrocarbons from slurries containing polymers other than polyethylene.

With reference to the FIGURE, a preferred embodiment of the present invention is shown schematically within dotted-line box 200. The portion of the FIGURE shown outside of dotted-line box 200 is generally representative of a known prior art process for removing a hydrocarbon (isobutane) from a polymer (polyethylene) slurry. It will be appreciated, however, that the present invention embodies methods and apparatus which correspond to and are represented by both the scheme shown within box 200 by itself, and the entire combination shown in the FIGURE.

In the prior art process shown outside of box 200, an aqueous polymer slurry containing solvent is fed from a polymerization reactor (not shown) to a first high pressure slurry tank (HPST) 10 wherein a portion of the solvent is flashed from the aqueous polymer slurry. Depending upon the specific hydrocarbon solvent to be removed and the type of polymer slurry, first HPST 10 is operated at a suitable temperature and pressure, and the slurry has a sufficient residence time in tank 10 so as to flash solvent from the slurry. The solvent flashed from the slurry is fed to a conventional solvent recovery system designated generally as 20, the details of which will not be described herein. The residual aqueous polymer slurry, which contains additional solvent, is then transferred via pipe or conduit 12 to a second slurry tank 14 wherein additional solvent is flashed from the slurry and vented to solvent recovery system 20. Second slurry tank 14 is preferably operated at a lower pressure than first tank 10. The residual slurry from tank 14 is then pumped via conduit 16 to a suitable polymer centrifuge 18 which spins off most of the water remaining in the aqueous polymer slurry. This water is drained from centrifuge 18 and transferred via line 22 to recycle water tank 24 and subsequently recycled as needed to first and/or second slurry tanks 10, 14 via line 26. Semi-dry polymer powder is discharged from centrifuge 18 and conveyed to a fluid bed dryer 28 via conduit 30. Fluid bed dryer 28 may be of any suitable type known in the art for drying polymer powders; for example, dryer 28 may utilize a countercurrent flow of heated gas (air or nitrogen) to vaporize any remaining solvent from the polymer particles. The dried polymer powder is then conveyed to a suitable finishing operation which may include the extrusion and pelletization operations designated generally by reference numeral 32.

In the prior art process described above, the gas containing the vaporized solvent is discharge to the atmosphere from fluid bed dryer 28 and may contain an undesirably high content of solvent (on the order of 1000–6000 ppm). It is the primary objective of the present invention to substantially reduce the output of hydrocarbon (isobutane solvent) emissions from fluid bed dryers or any drying devices in solid polymer production systems. This objective is accomplished by removing significantly more of the hydrocarbon (solvent) prior to drying the polymer powder in a fluid bed dryer.

In a preferred embodiment of the method of the present invention shown in the FIGURE, an aqueous polyethylene slurry containing isobutane solvent is fed to flash tank 100 via conduit 102. As shown, conduit 102 feeds the residual slurry from slurry tank 14 to flash tank 100. It will be appreciated, however, that the slurry may be fed to flash tank 100 from the first slurry tank 10 or directly from the polymerization reactor (not shown). The flow of the slurry to flash tank 100 is controlled by a suitable valve such as valve 104 in conduit 102 and the flow rate is monitored by flow meter 106.

Flash tank 100 is operated at a temperature and pressure suitable to flash a substantial amount of the solvent from the aqueous polymer slurry. In the case where the polymer slurry is an aqueous polyethylene slurry containing isobutane solvent, flash tank 100 may be operated at a pressure in the range of about 5–30 psia, and is preferably operated at a pressure in the range of about 9.4 to 19.7 psia and at a temperature in the range of about 190°–225° F. At these temperatures and pressures, isobutane solvent is flashed from the polyethylene slurry, vented from flash tank 100 and fed to solvent recovery operation 20 via conduit 108. The aqueous polyethylene slurry preferably has a residence time in flash tank 100 of greater than five minutes.

Slurry is discharged from the bottom of tank 100 via conduit 110 and is split into two fractions. The first fraction passes through valve 112 in conduit 114 and is fed to centrifuge 18 and the subsequent processing steps described hereinabove. Samples of the first fraction of slurry may be bled from conduit 114 and collected in drum 115 for purposes of analysis. The second fraction of the slurry is pumped via conduit 116 through a suitable heating means 120 (described below) in recirculation loop 111 to heat and pressurize the slurry and then recirculated to flash tank 100 to flash additional solvent from the slurry.

More particularly, recirculation loop 111 includes conduit 116, temperature indicators 117, 123 for monitoring the slurry temperature upstream and downstream of heating means 120, respectively, a slurry pump 118 which pumps the slurry through heating means 120, a valve 119 for controlling the flow and pressure of the slurry, and a flow meter 121 for monitoring the flow rate of recirculated slurry. The recirculated, heated slurry is returned to slurry tank 100 via return nozzle 122 which preferably includes an impingement plate (not shown) to disperse the slurry in the tank. The recirculated slurry is preferably heated by heating means 120 to a temperature in the range of about 195°–230° F. and maintained at a pressure above the operating pressure in flash tank 100 such that upon recirculation to the flash tank, additional solvent is flashed from the slurry. The additional flashed solvent is vented from tank 100 via line 108 as described hereinabove. The slurry recirculation ratio, i.e., the ratio of the second slurry fraction to the first slurry fraction is controlled by proper correlation of the settings of valves 112 and 119 and pump 118. Conduit 116 preferably includes a sample collector 124 and pressure indicator 125 downstream of pump 118 for monitoring the solvent content of the recirculated slurry while it is under pressure.

Three of the parameters which affect the successful removal of isobutane solvent from an aqueous polyethylene slurry utilizing the method of the present invention are the operating pressure and temperature in flash tank 100, and the residence time of the slurry in the flash tank. The following examples illustrate the effects of these parameters.

EXAMPLE 1—PRESSURE EFFECT

Slurry Feed
Concentration: $1749 \times 10^{-6}$ (lb isobutane/lb polymer)

| Tank Pressure (PSIG) | Flash Tank Outlet Slurry Concentration (lb isobutane/lb polymer) |
|---|---|
| 5 | $789 \times 10^{-6}$ |
| 3 | $589 \times 10^{-6}$ |
| 1 | $236 \times 10^{-6}$ |
| Residence Time: | 30 minutes |
| Recirculation Ratio: | 4:1 |
| Temperature: | 218 degrees F. |

The foregoing example illustrates that as the pressure in the flash tank is reduced, the concentration of isobutane in the aqueous polyethylene slurry outlet from the flash tank is correspondingly reduced. As a practical matter, due to equipment costs and safety concerns, the system will likely not be operated at a significant vacuum in the flash tank; however, doing so is certainly contemplated by the present invention.

EXAMPLE 2—TEMPERATURE EFFECT

Slurry Feed
Concentration: $1613 \times 10^{-6}$ (lb isobutane/lb polymer)

| Tank Temperature (°F.) | Flash Tank Outlet Slurry Concentration (lb isobutane/lb polymer) |
|---|---|
| 205 | $576 \times 10^{-6}$ |
| 210 | $450 \times 10^{-6}$ |
| 215 | $336 \times 10^{-6}$ |
| Residence Time: | 30 minutes |
| Pressure: | 1 PSIG |
| Recirculation Ratio: | 4:1 |

The foregoing example illustrates that as the temperature in the flash tank is increased, the concentration of isobutane in the aqueous polyethylene slurry outlet from the flash tank is decreased. Practical considerations such as the polymer softening point and the boiling point of water at the tank pressure limit the operating temperature in the flash tank.

EXAMPLE 3—RESIDENCE TIME EFFECT

Slurry Feed
Concentration: $1174 \times 10^{-6}$ (lb isobutane/lb polymer)

| Residence Time (Minutes) | Flash Tank Outlet Slurry Concentration (lb isobutane/lb polymer) | Recirculation Ratio |
|---|---|---|
| 40 | $80 \times 10^{-6}$ | 3:1 |
| 20 | $426 \times 10^{-6}$ | 1.5:1 |
| 10 | $662 \times 10^{-6}$ | 1:1 |
| Pressure: | 1.8 PSIG | |
| Temperature: | 215 degrees F. | |

The foregoing example illustrates that by increasing the residence time of the slurry in the flash tank, the concentration of isobutane solvent in the aqueous polyethylene slurry output from the flash tank is decreased.

By adjusting the flash tank operating pressure and temperature, as well as the residence time of the slurry in the flash tank and the recirculation ratio of the slurry to the flash tank, efficient and effective reductions in the concentration of isobutane in the aqueous polyethylene slurry are realized.

A preferred apparatus of the present invention includes a flash tank which has a steam jacket for heating the tank contents to the desired temperature. One suitable tank which has been used in testing the method of the present invention is rated at 100 psig and 250° F., is 46" in height and has an O.D. of 3' 5" (seam-seam). The flash tank is fitted with an agitator 130 which comprises a motor 132, shaft 134 and blades 136, to ensure uniform heating of the slurry. Tank 100 further includes a pressure indicator gauge 142 to monitor the tank pressure. Additionally, tank 100 includes a suitable device 145 for monitoring the slurry level in the tank. The slurry level monitoring device may be a visual device or a diaphragm d.p. cell or any of several conventional devices.

A preferred heating means 120 utilized in the practice of the present invention is a direct-contact, short-residence time heater such as the "Inline" heater manufactured by Pick Heaters, Inc., of West Bend, Wis. In this type of heater, the slurry is heated by direct contact with steam to a temperature near, but not exceeding, the polymer softening point so as not to melt the polymer and plug the heater. The steam is supplied to the heater 120 from a suitable steam supply designated generally as 150.

The remaining apparatus elements shown in the FIGURE, including fluid conduits, ball, block, globe and check valves, pumps, flow meters, and temperature and pressure gauges, are all standard pieces of equipment and therefore they will not be described in detail herein. While the invention has been described with particular reference to the removal of isobutane from an aqueous polyethylene slurry, it will be appreciated by persons skilled in the art that the removal of various hydrocarbons, including other solvents, as well as unreacted monomer and/or comonomer from a polymer slurry (not necessarily aqueous) can be accomplished utilizing the general principles of the present invention. Therefore, the scope of the present invention is not to be construed as limited to the specific examples described herein with respect to any single embodiment of the invention, but is to be accorded the scope of the appended claims.

What is claimed is:

1. A process for removing a hydrocarbon from a polymer slurry comprising the steps of:
    feeding a hydrocarbon-containing polymer slurry to a flash tank to flash a portion of the hydrocarbon from the slurry;
    circulating at least a portion of the polymer slurry from the flash tank through heating means to heat the slurry to a temperature above the operating temperature of the flash tank, and recirculating the heated slurry to the flash tank to flash additional hydrocarbon from the slurry; and
    collecting from said flash tank slurry having a substantially lower hydrocarbon content than the slurry fed to the flash tank.

2. The process of claim 1 wherein said hydrocarbon is solvent, monomer and comonomer.

3. The process of claim 2 wherein said hydrocarbon is a solvent and said polymer slurry is an aqueous polyolefin slurry.

4. The process of claim 3 wherein said solvent is isobutane and said aqueous polyolefin slurry is an aqueous polyethylene slurry.

5. The process of claim 4 wherein said flash tank is operated at a pressure in the range of about 5-30 psia and at a temperature in the range of about 190°-225° F.

6. The process of claim 5 wherein the slurry from the flash tank is circulated through said heating means at a pressure above the pressure in said flash tank and is heated to a temperature in the range of about 195°-230° F.

7. The process of claim 6 wherein the slurry has a residence time in said flash tank of at least about 5 minutes.

8. The process of claim 6 wherein the slurry is heated in direct-contact, short-residence time heating means by direct contact with steam supplied thereto.

9. The process of claim 1 further comprising venting the hydrocarbon flashed from the slurry in said flash tank.

10. A process for removing a hydrocarbon from a polymer slurry comprising the steps of:
 feeding a hydrocarbon-containing polymer slurry to a first flash tank to flash a portion of the hydrocarbon from the slurry;
 feeding the resulting slurry from the first flash tank to a second flash tank to flash additional hydrocarbon from the slurry, said second flash tank being operated at a lower pressure than said first flash tank;
 feeding the resulting polymer slurry from the second flash tank to a third flash tank to flash additional hydrocarbon from the slurry, said third flash tank being operated at a lower pressure than either of said first or second flash tanks;
 circulating at least a portion of the polymer slurry from the third flash tank through heating means to heat the slurry to a temperature above the operating temperature of the third flash tank, and recirculating the heated slurry to the third flash tank to flash additional hydrocarbon from the slurry; and
 collecting from said third flash tank slurry having a substantially lower hydrocarbon content than the slurry fed to the third flash tank.

11. The process of claim 10 wherein said hydrocarbon is solvent, monomer or comonomer.

12. The process of claim 11 wherein said hydrocarbon is a solvent and said polymer slurry is an aqueous polyolefin slurry.

13. The process of claim 12 wherein said solvent is isobutane and said aqueous polyolefin slurry is an aqueous polyethylene slurry.

14. The process of claim 13 wherein said third flash tank is operated at a pressure in the range of about 5-30 psia and at a temperature in the range of about 190°-225° F.

15. The process of claim 14 wherein the slurry from the third flash tank is circulated through said heating means at a pressure above the pressure in said third flash tank and is heated to a temperature in the range of about 195°-230° F.

16. The process of claim 15 wherein the slurry has a residence time in said third slurry tank of at least about 5 minutes.

17. The process of claim 15 wherein the slurry is heated in direct-contact, short-resident time heating means by direct contact with steam supplied thereto.

18. The process of claim 10 further comprising venting the hydrocarbon flashed from the slurry in said third flash tank.

19. In a process for removing a hydrocarbon from a polymer slurry including the steps of feeding the hydrocarbon-containing polymer slurry to a first flash tank to flash a portion of the hydrocarbon from the slurry, and feeding the resulting slurry from the first flash tank to a second flash tank to flash additional hydrocarbon from the slurry, wherein the second flash tank is operated at a lower pressure than the first flash tank, the improvement comprising:
 feeding the resulting polymer slurry from the second flash tank to a third flash tank to flash additional hydrocarbon from the slurry, said third flash tank being operated at a lower pressure than either of said first or second flash tanks;
 circulating at least a portion of the polymer slurry from the third flash tank through heating means to heat the slurry to a temperature above the operating temperature of the third flash tank, and recirculating the heated slurry to the third flash tank to flash additional hydrocarbon from the slurry; and
 collecting from said third flash tank slurry having a substantially lower hydrocarbon content than the slurry fed to the third flash tank.

20. The process of claim 19 wherein said hydrocarbon is solvent, monomer or comonomer.

21. The process of claim 20 wherein said hydrocarbon is a solvent and said polymer slurry is an aqueous polyolefin slurry.

22. The process of claim 21 wherein said solvent is isobutane and said aqueous polyolefin slurry is an aqueous polyethylene slurry.

23. The process of claim 22 wherein said third flash tank is operated at a pressure in the range of about 5-30 psia and at a temperature in the range of about 190°-225° F.

24. The process of claim 23 wherein the slurry from the third flash tank is circulated through said heating means at a pressure above the pressure in said third flash tank and is heated to a temperature in the range of about 195°-230° F.

25. The process of claim 24 wherein the slurry has a residence time in said third slurry tank of at least about 5 minutes.

26. The process of claim 24 wherein the slurry is heated in direct-contact, short-residence time heating means by direct contact with steam supplied thereto.

27. The process of claim 19 further comprising venting the hydrocarbon flashed from the slurry in said third flash tank.

* * * * *